United States Patent
Jeon et al.

(10) Patent No.: US 10,802,646 B2
(45) Date of Patent: Oct. 13, 2020

(54) ELECTRONIC DEVICE

(71) Applicant: LG ELECTRONICS INC., Seoul (KR)

(72) Inventors: Sangkuk Jeon, Seoul (KR); Juha Hyun, Seoul (KR); Minkyoung Shin, Seoul (KR); Mansoo Sin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/472,788

(22) PCT Filed: Dec. 28, 2016

(86) PCT No.: PCT/KR2016/015438
§ 371 (c)(1),
(2) Date: Jun. 21, 2019

(87) PCT Pub. No.: WO2018/124334
PCT Pub. Date: Jul. 5, 2018

(65) Prior Publication Data
US 2019/0369799 A1    Dec. 5, 2019

(51) Int. Cl.
*G06F 3/041* (2006.01)
*G06F 3/044* (2006.01)
(Continued)

(52) U.S. Cl.
CPC ............ *G06F 3/0416* (2013.01); *G06F 3/044* (2013.01); *G06F 21/32* (2013.01); *G06K 9/0002* (2013.01);
(Continued)

(58) Field of Classification Search
CPC ........ G06F 3/0416; G06F 3/044; G06F 21/32; G06F 3/0446; G06F 3/041661;
(Continued)

(56) References Cited

U.S. PATENT DOCUMENTS 5,325,442 A * 6/1994 Knapp ............... G01B 7/004
361/278
2011/0090541 A1* 4/2011 Harper ............... H04L 9/0637
358/474
(Continued)

FOREIGN PATENT DOCUMENTS

KR    101085448    11/2011
KR    20160096390    8/2016
(Continued)

OTHER PUBLICATIONS

PCT International Application No. PCT/KR2016/015438, International Search Report dated Sep. 20, 2017, 2 pages.

*Primary Examiner* — Andrew Sasinowski
(74) *Attorney, Agent, or Firm* — Lee, Hong, Degerman, Kang & Waimey

(57) ABSTRACT

The present invention comprises: a first region, having a display area for outputting images, for receiving touch input or acquiring fingerprint data by means of a touch entered on the display area; a touchscreen comprising a second region for receiving touch input; and a control unit for switching the first region from a touch receiving mode, which receives touch input, to a fingerprint sensing mode when a touch input is entered in the first region, wherein the touchscreen is provided with a touch sensor layer for receiving touch input at a first sense resolution in the touch receiving mode, and the control unit which, in the fingerprint sensing mode, switches the first region from the first sense resolution to a second sense resolution, which is higher than the former, so as to acquire fingerprint data, and maintains the second region at the first sense resolution so that the former receives touch input.

19 Claims, 19 Drawing Sheets

(51) Int. Cl.
*G06K 9/00* (2006.01)
*G09G 3/36* (2006.01)
*G06F 21/32* (2013.01)

(52) U.S. Cl.
CPC ....... *G09G 3/36* (2013.01); *G09G 2300/0413* (2013.01); *G09G 2300/0426* (2013.01)

(58) Field of Classification Search
CPC ..... G06F 3/0448; G06F 3/041; G06K 9/0002; G06K 9/00; G09G 3/36; G09G 2300/0413; G09G 2300/0426; G09G 2354/00; G09G 2358/00
See application file for complete search history.

(56) References Cited

U.S. PATENT DOCUMENTS

| | | | |
|---|---|---|---|
| 2014/0333328 A1 | 11/2014 | Nelson et al. | |
| 2016/0078274 A1* | 3/2016 | Tuneld | G06K 9/00885 382/124 |
| 2018/0211088 A1* | 7/2018 | Cho | G09G 5/00 |
| 2020/0050360 A1* | 2/2020 | Jeon | G06F 21/32 |

FOREIGN PATENT DOCUMENTS

| | | |
|---|---|---|
| KR | 20160132761 | 11/2016 |
| KR | 101682158 | 12/2016 |

\* cited by examiner

ELECTRONIC DEVICE

CROSS-REFERENCE TO RELATED APPLICATIONS

This application is the National Stage filing under 35 U.S.C. 371 of International Application No. PCT/KR2016/015438, filed on Dec. 28, 2016, the contents of which are all hereby incorporated by reference herein in its entirety.

TECHNICAL FIELD

The present invention relates to a mobile terminal and a method for controlling the same.

BACKGROUND ART

Terminals may be divided into mobile/portable terminals and stationary terminals according to mobility. Also, the mobile terminals may be classified into handheld types and vehicle mount types according to whether or not a user can directly carry.

The terminal has various functions according to development of technologies. For example, a mobile terminal can be allowed to capture still images or moving images, play music or video files, play games, receive broadcast and the like, so as to be implemented as an integrated multimedia player. Efforts are ongoing to support and increase the functionality of terminals. Such efforts include software improvements, as well as changes and improvements in the structural components.

In recent years, biometric user authentication technologies have been developed. In particular, a fingerprint sensing device, which uses fingerprint data having unique biometric information of an individual as a user authentication method, has been applied to a mobile terminal. However, in a mobile terminal employing a fingerprint sensor, an additional sensing layer is required. In this case, a touch input on a fingerprint sensing area is not detected.

DISCLOSURE

Technical Problem

Therefore, one aspect of the present invention is to provide an electronic device capable of detecting a fingerprint on one area of a touch screen.

Technical Solution

In order to achieve the aspect and other advantages of the present invention, there is provided an electronic device including a touch screen having a display area for displaying an image, a first area receiving a touch input and acquiring fingerprint information based on a touch applied to the display area, and a second area for receiving a touch input, and a controller configured to switch a first area's mode from a touch receiving mode for receiving the touch input to a fingerprint sensing mode. The touch screen may be provided with a touch sensing module for receiving a touch input at a first resolution in the touch receiving mode. The controller may change the first sensing resolution of the first area to a higher second sensing resolution so as to acquire the fingerprint information in the touch receiving mode, and maintain the sensing resolution of the second area at the first sensing resolution so as to receive the touch input in the fingerprint sensing mode.

In one embodiment of the present invention, the touch sensing module may include a plurality of electrode lines arranged at predetermined intervals so as to detect a touch at the second resolution. The touch sensing module may be electrically connected to one of a first circuit board or a second circuit board according to whether the mode is the fingerprint sensing mode or the touch receiving mode, and include a plurality of sensing (electrode) line sections and a plurality of dummy (electrode) line sections alternately arranged with each other. Each of the plurality of sensing line sections and dummy line sections may have a preset number of electrode lines grouped to have a low sensing resolution, thereby detecting a touch input.

In one embodiment of the present invention, a switch unit connected to the electrode lines of the touch sensing module may be further provided so as to change the sensing resolution of the second area. The switch unit may include a first switch and a second switch for connecting the plurality of sensing line sections to a first circuit board and a second circuit board, respectively, and a fourth switch connected to each of the plurality of dummy line sections. The controller may selectively connect or disconnect the first and second switches in the touch receiving mode and the fingerprint sensing mode so as to control the plurality of electrode lines to have a first sensing resolution and a second sensing resolution by grouping and ungrouping them.

Advantageous Effects

According to the present invention, a sensing resolution of a touch sensing module for detecting a touch input on a touch screen is changed to detect a fingerprint, thereby requiring no additional fingerprint sensor. Thus, a failure in detecting a touch input on a fingerprint sensing area by an additional sensor can be prevented.

In addition, since a specific area is switched to a touch receiving mode or a fingerprint sensing mode, fingerprint sensing and touch screen display can be enabled by the specific area in a screen lock state. Accordingly, it is possible to prevent a user authentication function from being activated or a touch screen from being turned on due to an unintended or accidental touch.

BRIEF DESCRIPTION OF THE DRAWINGS

FIGS. 1B and 10 are views of a mobile terminal according to one exemplary embodiment of the present invention, viewed from different directions.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
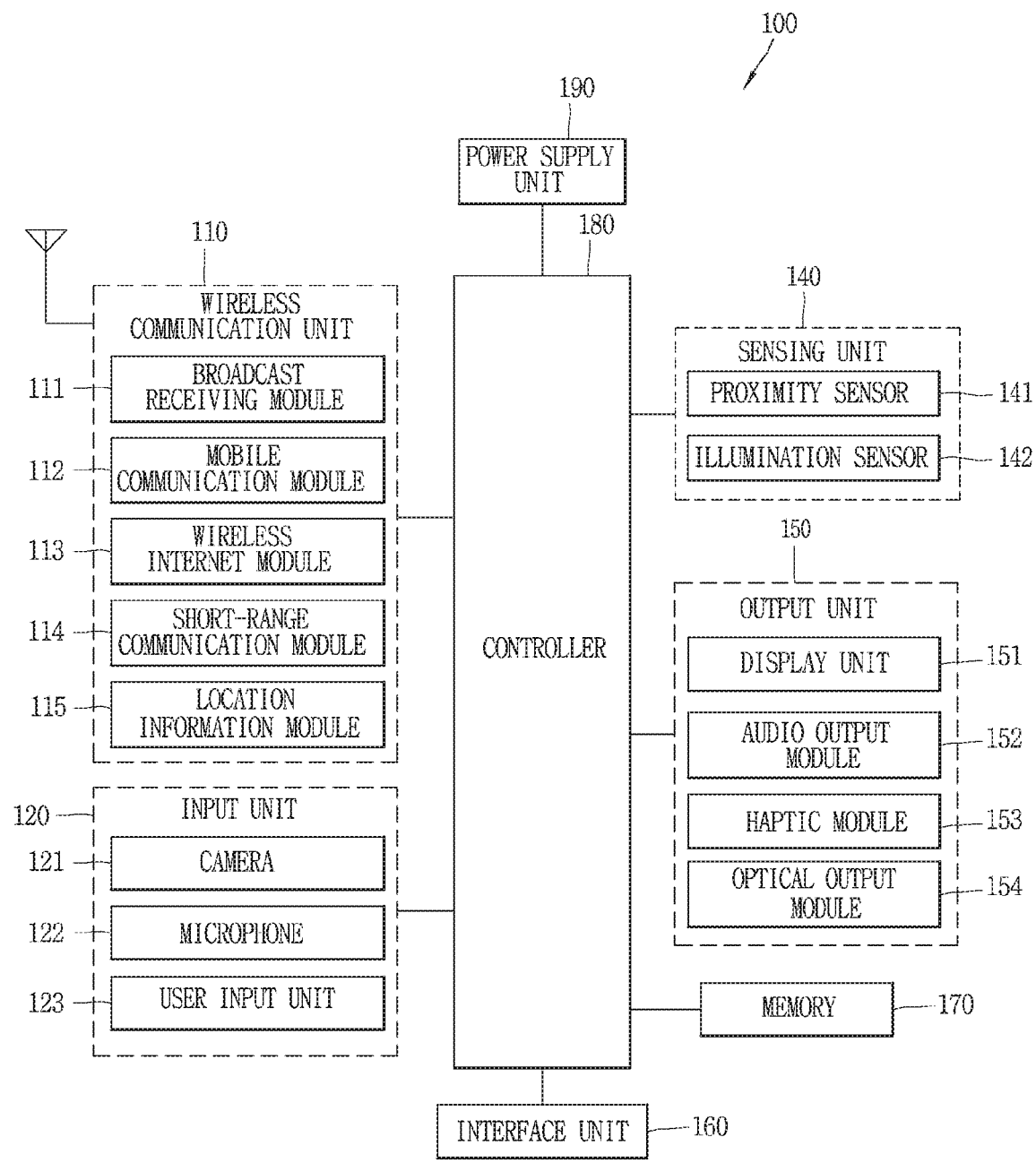
FIG. 1A is a block diagram of a mobile terminal according to an embodiment of the present invention.

FIG. 1A is a block diagram of a mobile terminal 100 according to an exemplary embodiment of the present invention.

The mobile terminal 100 may be shown having components such as a wireless communication unit 110, an input unit 120, a sensing unit 140, an output unit 150, an interface unit 160, a memory 170, a controller (control unit) 180, and a power supply unit 190. FIG. 1 shows the mobile terminal 100 having various components, but it may be understood that implementing all of the illustrated components is not a requirement. Greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal 100, the surrounding environment of the mobile terminal 100, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the wearable device 100, under the control of the controller 180. The power supply unit 190 may include a battery, and the battery may be configured as an embedded battery or a detachable battery.

At least part of the components may cooperatively operate to implement an operation, a control or a control method of the mobile terminal 100 according to various embodiments disclosed herein. Also, the operation, the control or the control method of the mobile terminal 100 may be implemented on electronic device by an activation of at least one application program stored in the memory 170.

Hereinafter, description will be given in more detail of the aforementioned components with reference to FIG. 1, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneous reception of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another electronic device may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal 100. As an example, the location information module 115 includes a Global Position System (GPS) module, a Wi-Fi module, or both. For example, when the mobile terminal 100 uses a GPS module, a position of the mobile terminal 100 may be acquired using a signal sent from a GPS satellite. As another example, when the mobile terminal 100 uses the Wi-Fi module, a position of the mobile terminal 100 may be acquired based on information related to a wireless access point (AP) which transmits or receives a wireless signal to or from the Wi-Fi module. If desired, the location information module 115 may alternatively or additionally perform a function of any of the other modules of the wireless communication unit 110 to obtain data related to the position of the mobile terminal 100. The location information module 115 is a module used for acquiring the position (or the current position) of the mobile terminal 100, and may not be limited to a module for directly calculating or acquiring the position of the electronic device.

Next, the input unit 120 is for inputting image information (or signal), audio information (or signal), data, or information input from a user. For inputting image information, the mobile terminal 100 may be provided with a plurality of cameras 121. Such cameras 121 may process image frames of still pictures or video obtained by image sensors in a video or image capture mode. The processed image frames can be displayed on the display unit 151 or stored in memory 170. Meanwhile, the cameras 121 provided in the mobile terminal 100 may be arranged in a matrix configuration to permit a plurality of image information having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal 100, surrounding environment information of the mobile terminal 100, user information, or the like, and generates a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal 100 covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, the controller 180 may process data corresponding to proximity touches and proximity touch patterns sensed by the proximity sensor 141, and cause visual information corresponding to the processed data to be output on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the touch screen, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the object in vicinity of the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source of the mobile terminal 100. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal 100 emits monochromatic light or light with a plurality of colors to a front or rear surface. The signal output may be terminated as the mobile terminal 100 senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal 100 meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, description will be given of a structure of the mobile terminal 100 according to the one embodiment of the present invention illustrated in FIG. 1A or a terminal having those components, with reference to FIG. 10.

Figure 1B:
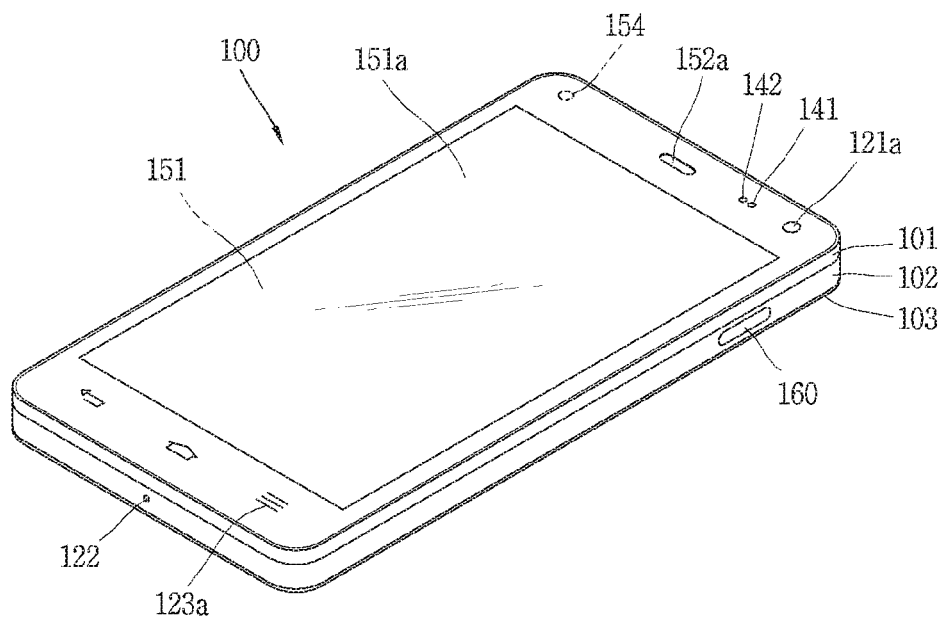
Figure 1C:
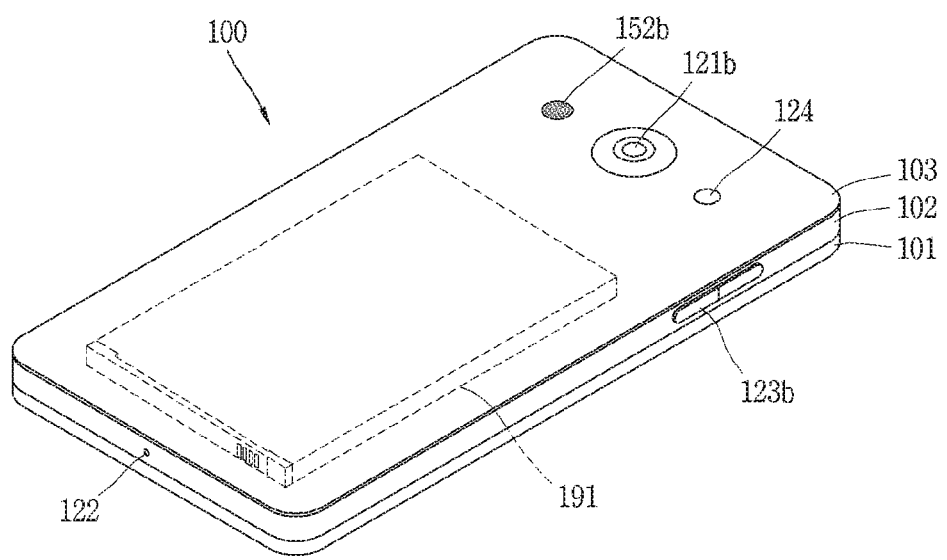

Referring to FIGS. 1B and 10, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally be applied to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 10, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be designated.

On the other hand, the touch sensor may be configured in a form of a film having a touch pattern and disposed between a window and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a. Hereinafter, for the sake of explanation, the display unit (display module) for outputting the image and the touch sensor are collectively referred to as a touch screen 151.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

An antenna according to the present invention includes an antenna pattern 110' formed in one area of the mobile terminal body 100. The antenna pattern 110' has a predetermined length to transmit and receive a radio signal in a predetermined frequency range. For example, the antenna pattern 110' according to one exemplary embodiment of the present invention may be formed at a lower end portion of the mobile terminal body 100. However, a placement position of the antenna pattern 110' is not limited thereto. For example, the antenna pattern 110' may be formed on one area of the rear cover 103, or on an inner frame that forms an inner structure of the mobile terminal body 100.

FIGS. 2A to 2F are conceptual views illustrating a structure of a display module and a touch sensor according to various embodiments of the present invention.

Figure 2A:
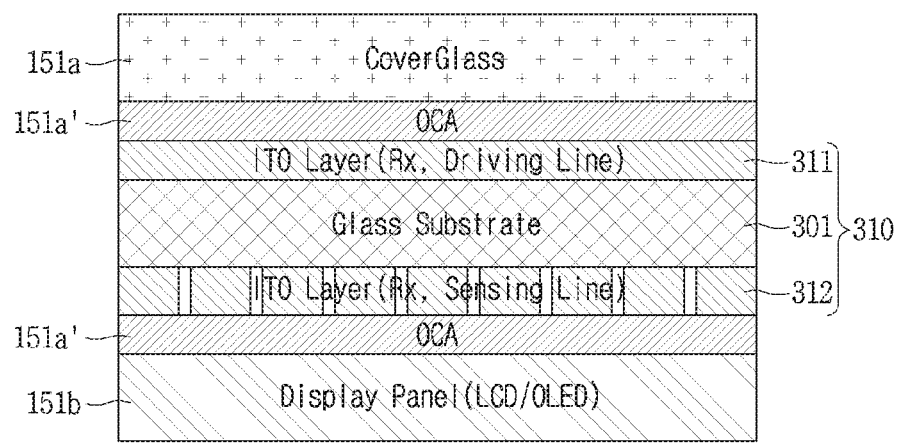
FIGS. 2A to 2F are conceptual views illustrating a structure of a display module and a touch sensor in accordance with various embodiments of the present invention.

A touch screen 151 according to FIG. 2A includes a cover glass 151a, a display module 151b, and a touch sensing module 310. The touch sensing module 310 is formed on the display module 151b, and the cover glass 151a is formed on the touch sensing module 310. An adhesive layer (OCA) 151a' is formed between the display module 151b and the touch sensing module 310, and between the cover glass 151a and the touch sensing module 310, respectively.

The touch sensing module 310 is formed on both surfaces of a glass substrate 301, and includes first and second sensing layers 311, 312 which include a plurality of electrode lines intersecting with each other. The first and second sensing layers 311, 312 are formed with a Tx layer and an Rx layer, respectively.

The first and second sensing layers 311, 312 are insulated by the glass substrate 301. Capacitance is changed by a finger making contact with the cover glass 151a, and a touch input is sensed through changes in the capacitance.

Figure 2B:
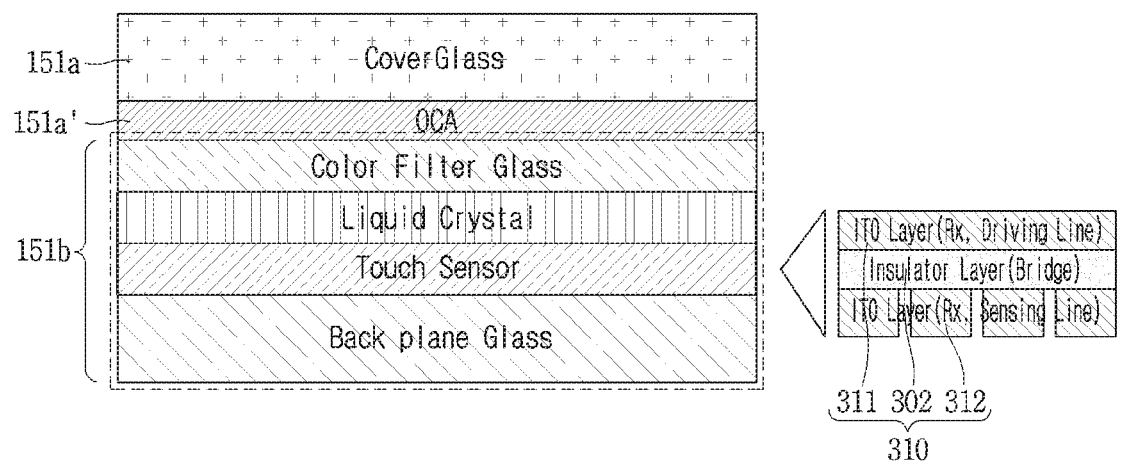

In a touch screen 151 according to FIG. 2B, the display module 151b is coupled below the cover glass 151a by the adhesive layer 151a'. The display module 151b includes a backplane glass having a backlight, a liquid crystal layer, and a color filter layer. The touch sensing module 310 is formed on the backplane glass.

The first sensing layer 311 is formed on the backplane glass, and an insulator layer 302 is formed in contact with the first sensing layer 311. The second sensing layer 312 is formed on the insulator layer 302 and the backplane glass so as not to be in contact with the first sensing layer 311. Accordingly, the first and second sensing layers 311, 312 may be formed on the backplane glass in an insulted state from each other by the insulator layer 302.

Figure 2C:
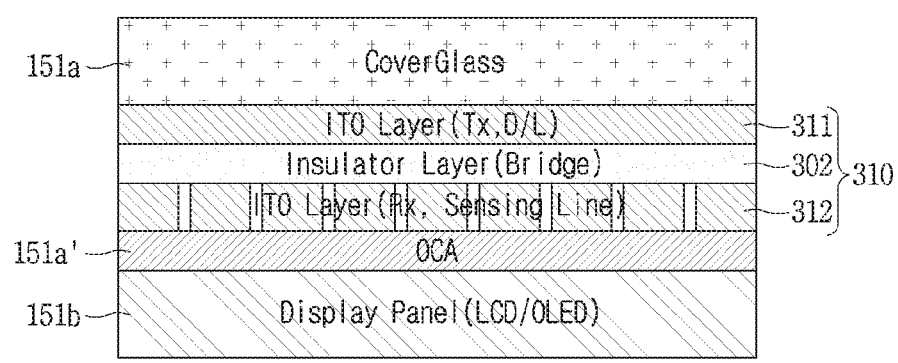

Referring to FIG. 2C, the first and second sensing layers 311, 312 are formed in contact with the cover glass 151a. For example, the first sensing layer 311 is formed in an inner surface of the cover glass 151a, and the insulator layer 302 is formed in contact with the first sensing layer 311. The second sensing layer 312 is formed on the insulator layer 302 and the cover glass 151a so as not to be in contact with the first sensing layer 311.

The display module 151b is mounted below the cover glass 151a formed integrally with the touch sensing module 310.

According to these embodiments, the first and second sensing layers, which need to be insulated from each other, are formed on one glass substrate (window or backplane glass), thereby reducing a thickness of a touch screen.

Figure 2D:
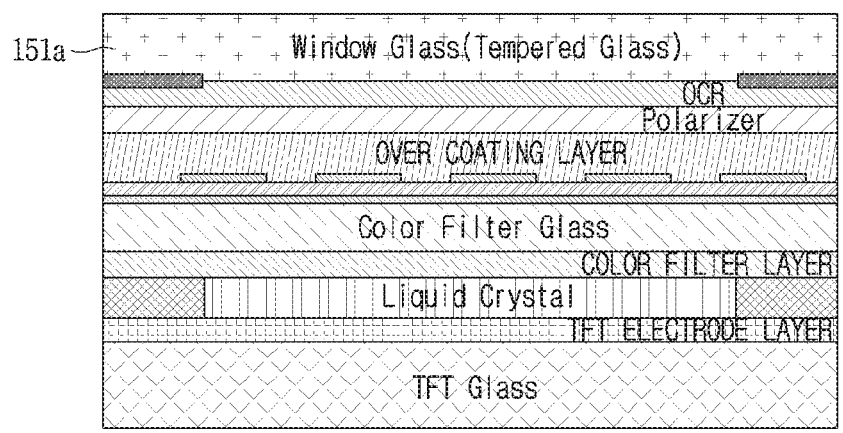

Referring to FIG. 2D, an insulator layer 303, a first sensing layer 311, and a second sensing layers 312 constituting a touch sensing module 310 may be disposed between each component of a display module 320.

The display module 320 includes a TFT electrode layer 322 formed on one surface of a TFT glass 321, a color filter layer 324 formed on one surface of a color filter glass 325, a liquid crystal layer 323 disposed between the color filter layer 324 and the TFT electrode layer 322, and a polarizer 327 disposed on the color filter glass 325. The polarizer 327 is attached by a transparent adhesive layer (OCA) 151a'.

The TFT electrode layer 322 is formed on the TFT glass 321, and the color filter layer 324 is formed on the color filter glass 325. The liquid crystal layer 323 is disposed between the color filter layer 323 and the TFT electrode layer 322.

The second sensing layer 312 is formed on the color filter glass 325, and an insulator layer 303 is disposed on the second sensing layer 312. The first sensing layer 311 is formed on the insulator layer 303.

A coating layer 326 is formed on the first sensing layer 311 and a polarizer 327 attached to a cover (window) glass 151a is formed on the coating layer 326.

In other words, since the first and second sensing layers 311, 312 are formed on the color filter glass 325, which is used for a base substrate among the components of the display module 151b, no additional configuration is required, thereby reducing a thickness of a display module.

Figure 2E:
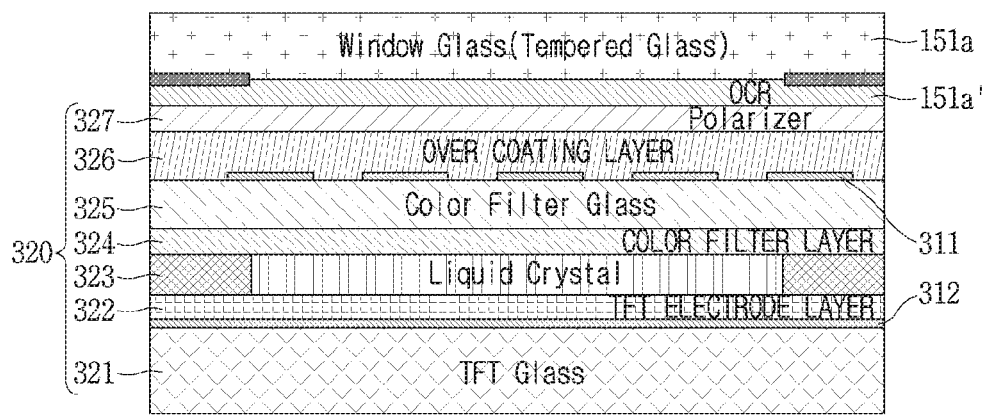

Referring to FIG. 2E, the display module 320 includes the TFT electrode layer 322 formed on one surface of the TFT glass 321, a color filter layer 324 formed on one surface of the color filter glass 325, the liquid crystal layer 323 disposed between the color filter layer 324 and the TFT electrode layer 322, and the polarizer 327 disposed on the color filter glass 325. The polarizer 327 is attached by the transparent adhesive layer 151a'.

The first sensing layer 311 is formed on the color filter glass 325, and the coating layer 326 is formed on one surface on which the first sensing layer 311 is formed. The second sensing layer 312 is formed on the TFT glass 321.

Figure 2F:
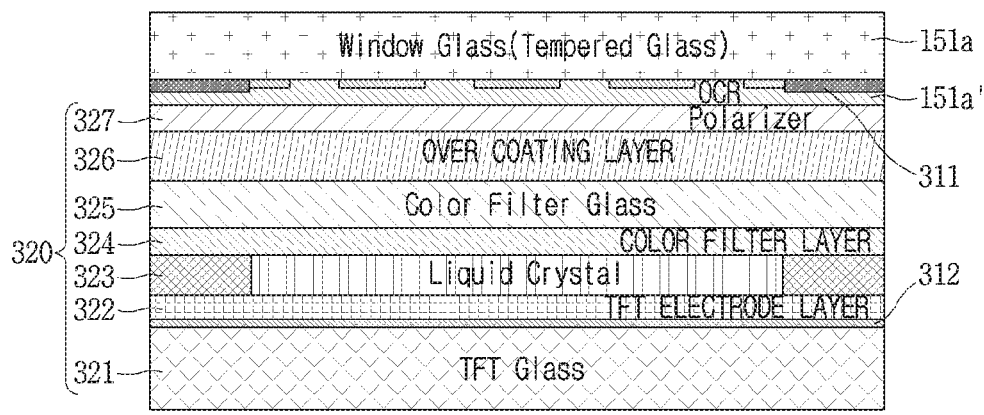

Referring to FIG. 2F, the second sensing layer 312 is formed on the TFT glass 321, but the first sensing layer 311 is formed on one surface on which the polarizer 327 of the cover glass 151a is formed.

In other words, according to the embodiments, the first and second sensing layers included in the touch sensing module (or touch sensor layer) 310 may be disposed at different areas of the display module and the cover glass.

Hereinafter, a method for controlling the touch sensing module 310 having the first and second sensing layers will be described.

Figure 3A:
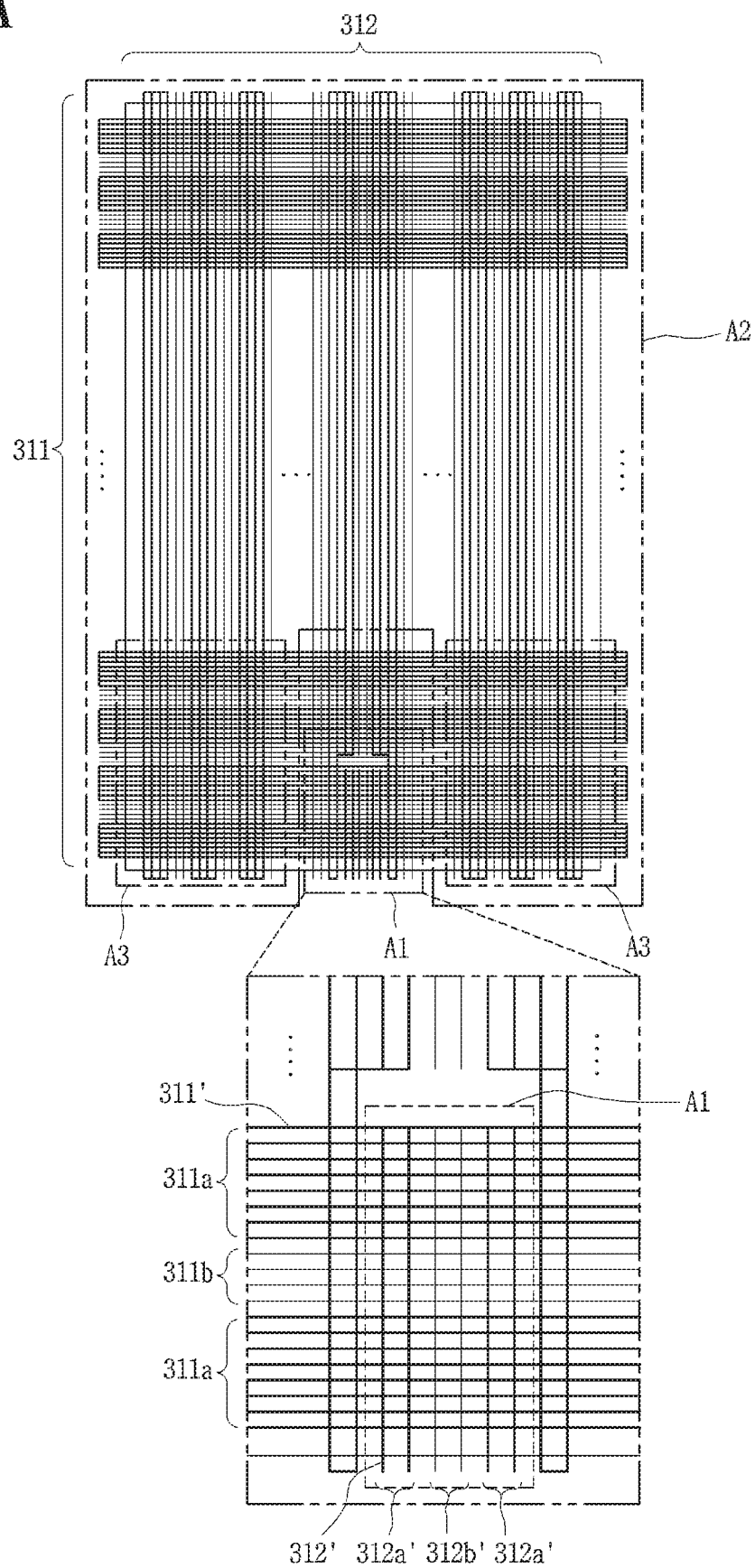
FIGS. 3A to 3C are conceptual views illustrating a control method for changing a sensing resolution of a touch sensing module.
Figure 3B:
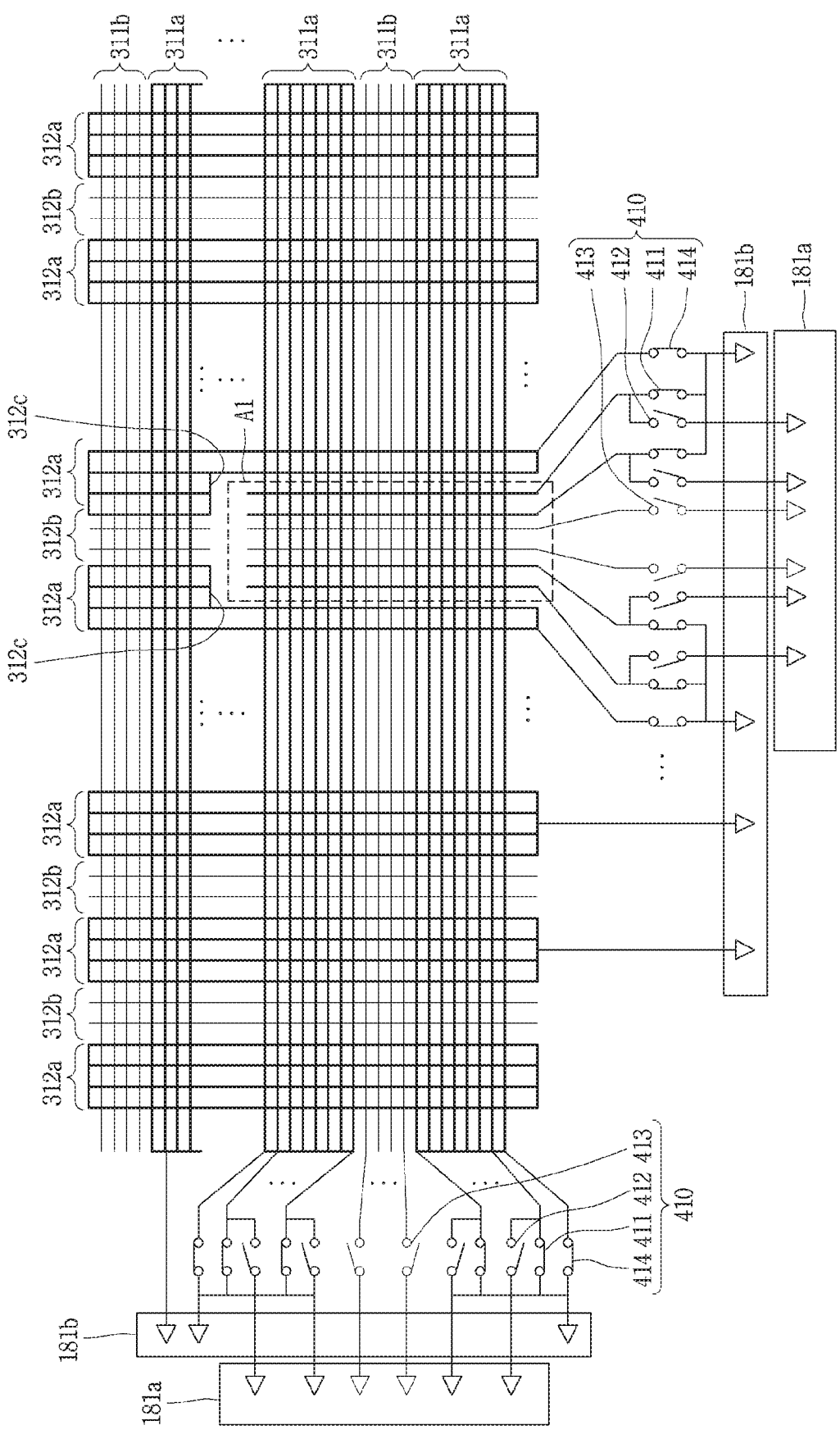
Figure 3C:
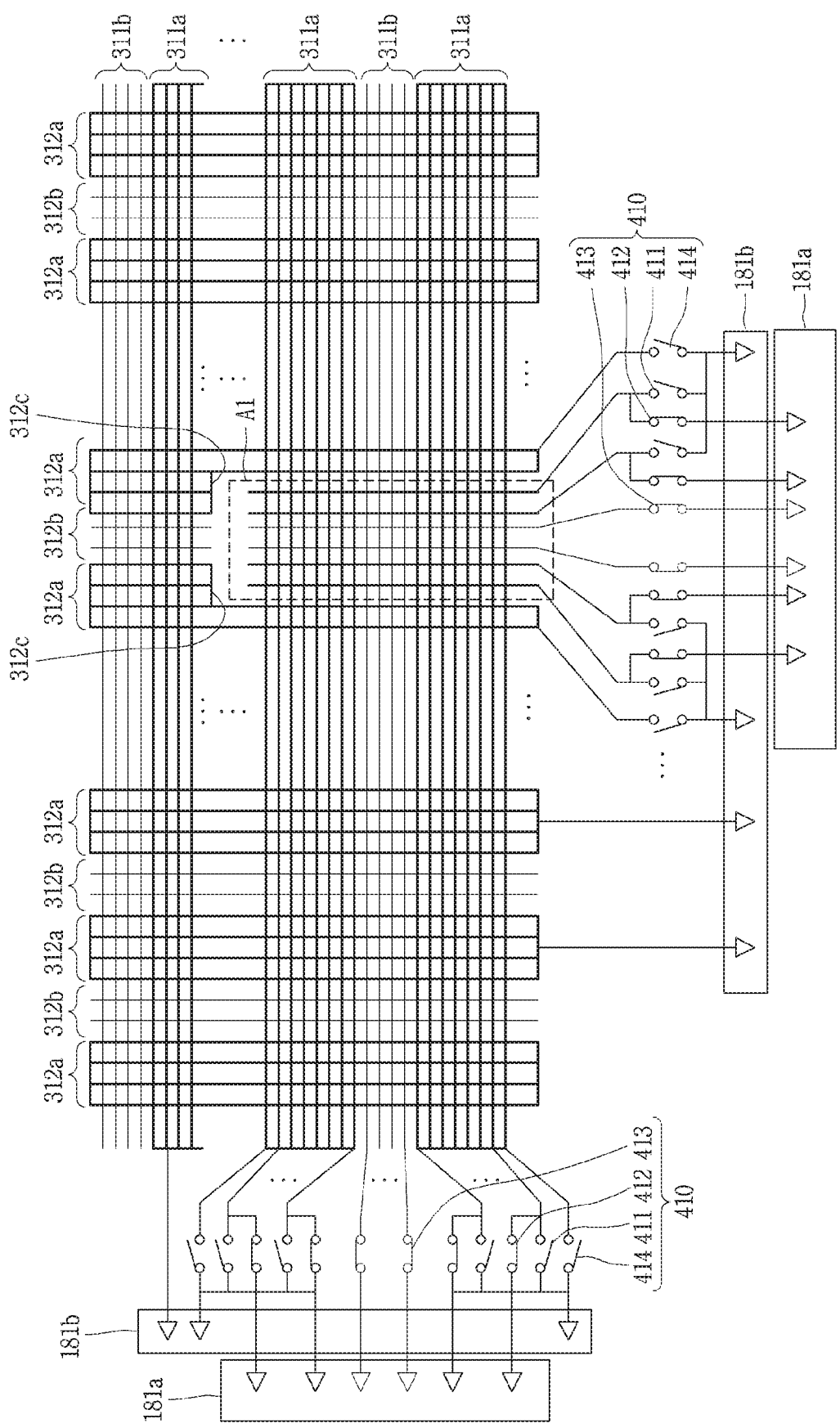

FIGS. 3A to 3C are conceptual views illustrating a control method for changing a sensing resolution of a touch sensing module.

Referring to FIG. 3A, the touch sensing module 310 includes a first sensing layer 311 having first electrode lines Rx extending in a first direction, and a second sensing layer 312 having second electrode lines Tx extending in a second direction intersecting the first direction. The first and second electrode lines extend in a direction intersecting with each other, and are insulated from each other. The first and second sensing layers 311, 312 include a plurality of first and second electrode lines. The plurality of first and second electrode lines is arranged at predetermined intervals so that a touch is sensed at the second sensing resolution.

The touch sensing module 310 may be divided into a first area A1 and a second area A2. The first area (region) may receive a touch input by a finger making contact with the cover glass 151a, or obtain fingerprint information of the finger. However, as for the second area (region) of the touch sensing module 310, receiving the touch input is available, but obtaining the fingerprint information is unavailable.

The first sensing layer 311 includes a first sensing (electrode) line section 311a and a first dummy (electrode) line section 311b, and the second sensing layer 312 includes a second sensing (electrode) line section 312a and a second dummy (electrode) line section 312b. Each of the first and second sensing line sections 311a, 312a, and each of the first and second dummy line sections 311b, 312b include a predetermined number of electrode lines, and each of the electrode lines is substantially the same.

A plurality of electrode lines included in each of the first and second sensing line sections 311a, 312a in the second area A2 is electrically connected to each other to form one single sensing line. The plurality of first and second sensing line sections 311a, 312a is electrically connected to a circuit board, and the plurality of first and second dummy line sections 311b, 312b is not electrically connected to a circuit board. That is, a touch input is not detected by the first and second dummy line sections 311b, 312b.

Accordingly, the second area A2 detects the touch input at the first sensing resolution by the first and second sensing line sections 311a, 312a. In the first and second dummy line sections 311b, 312b, no current flows and changes in capacitance are not detected, thereby detecting a touch input is unavailable. Therefore, fingerprint information is not detected by the second area A2.

Meanwhile, in the first area A1, the first and second sensing line sections 311a, 312a, and the first and second dummy line sections 311b, 312b are arranged to intersect with each other. Electrode lines 311' of the first and second sensing line sections 311a, 312a, and electrode lines 312' of the first and second dummy line sections 311b, 312b disposed in the first area A1 are selectively connected to a circuit board to sense a touch input or a fingerprint at the first sensing resolution or the second sensing resolution.

A driving method for detecting a touch or obtaining fingerprint information will be described with reference to FIGS. 3B and 3C. In order for this, a plurality of electrode lines included in the first and second sensing line sections 311a, 312a, and the first and second dummy line sections 311b, 312b are selectively connected to a circuit board.

FIG. 3B is a conceptual view illustrating a driving state of a plurality of sensing electrode lines for receiving a touch input.

Referring to FIG. 3B, a switch unit 410 is connected to the touch sensing module 310, so that electrode lines included in the first area A1 of the touch sensing module 310 are selectively connected to first and second circuit boards 181a, 181b. Each of the first and second sensing line sections 311a, 312a included in the second area A2 is electrically connected to the second circuit board 181b for sensing the touch sensor as one single sensing line. The first and second dummy line sections 311b, 312b included only in the second area A2 are not electrically connected to the circuit board.

The second sensing line section 312a of the second area A2 in contact with (or adjacent to) the first area A1 is disconnected from the second sensing line section 312a of the first area A1, and is electrically connected to the second sensing line section 312a of the second area A2. A plurality of electrode lines of the second sensing line section 312a of the second area A2, which is in a disconnected state from the first area A1, is electrically connected by a connecting electrode line 312c. A plurality of electrode lines of the second sensing line section 312a connected by the connecting electrode line 312c may be connected to the second circuit board 181b as one single sensing line.

A plurality of electrode lines of the first and second sensing line sections 311a, 312a included in the first area A1 is connected to a first switch 411 and a second switch 412, respectively. One of the first and second switches 411, 412 is selectively connected or disconnected. Each of the plurality of electrode lines is connected to the first circuit board 181a or the second circuit board 181b by the first switch 411 or the second switch 412. The second sensing line section 312a of the second area A2 adjacent to the first area A1 is connected to a fourth switch 414 so as to connect the second sensing line section 312a to the second circuit board 181b.

The fourth switch 414 connects the second sensing line section 312a to the second circuit board 181b in a touch receiving mode in which the touch input is detected at the first sensing resolution.

In the touch receiving mode, the controller controls to connect each of the plurality of first and second electrode lines included in the first and second sensing line sections 311a, 312a to the second circuit board 181b by the first switch 411. The plurality of electrode lines of the first and second sensing line sections 311a, 312a connected to the first switch 411 is grouped into one sensing line so as to be electrically connected to the second circuit board 181b. Part of the second sensing line section 312a included in the first area A1 may be connected to part of the second sensing line section 312a included in the second area A2 to form one single sensing line. For example, a plurality of electrode lines connected by the first switch 411 in the first area A1 is connected to electrode lines connected by the fourth switch 414 in the second area A2 so as to be connected to the second circuit board 181b as one sensing line.

In this case, the second switch 412 is disconnected in the touch receiving mode. Accordingly, in order to receive a touch input, a plurality of sensing lines including a plurality of first and second electrode lines is arranged at intervals corresponding to an area in which the dummy line sections 311b and 312b are formed. The plurality of sensing lines of the first and second sensing line sections 312a, 312b may sense the touch input at the first sensing resolution based on the intervals generated by the dummy line sections 311b, 312b.

A driving state of the touch sensing module when acquiring fingerprint information at the second sensing resolution higher than the first sensing resolution will be described with reference to FIG. 3B.

Each of the plurality of electrode lines included in the first area A1 is a respective sensing line, and is connected to the first circuit board 181a. That is, each of the plurality of first and second electrode lines included in the first and second sensing line sections 311a, 312a is directly connected to the first circuit board 181a by the second switch 412. In this case, the first switch 411 is disconnected.

A plurality of first and second electrode lines included in the first and second dummy line sections 311b, 312b is connected to a third switch 413. Each of the first and second electrode lines is connected to the first circuit board 181a by the third switch in the fingerprint sensing mode. In the touch receiving mode, the third switch 413 disconnects connection of the first and second electrode lines.

Meanwhile, the controller may form a sensing line for sensing the touch input at the first sensing resolution by grouping a plurality of electrode lines included in the second area A2 by the first switch 411.

Referring back to FIG. 3A, a third area A3 including first electrode lines passing through the first area A1 may be formed. In the fingerprint sensing mode, the controller may connect the first switch 411 to the second electrode line (312') while obtaining fingerprint information in the first area A1 at the second sensing resolution. In this case, however, the controller ignores a touch input applied to the third area A3.

Alternatively, the controller 180 may control the rest of the electrode lines except the first and second electrode lines included in the first area A1 to be disconnected.

According to this embodiment of the present invention, a plurality of electrode lines arranged to have a second sensing resolution is grouped so as to sense a touch input at a first sensing resolution, and fingerprint information can be obtained by a plurality of electrode lines arranged in a specific area (first area) at the second sensing resolution.

Accordingly, an additional fingerprint sensor layer is unnecessary since a touch input and fingerprint information can be obtained through one touch sensing (sensor) layer including a plurality of electrode lines.

Figure 4A:
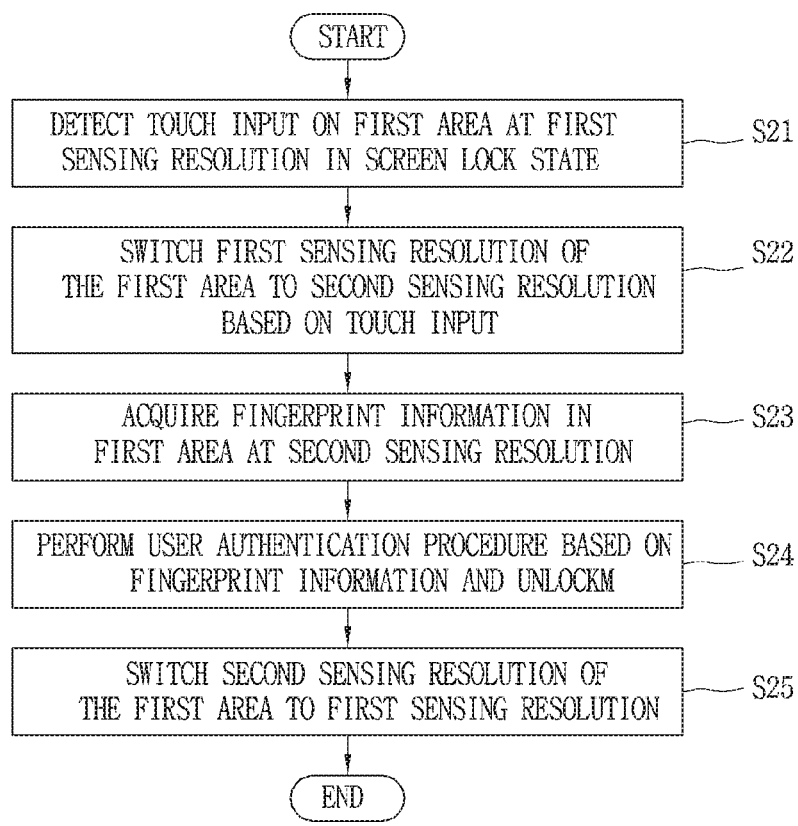
FIG. 4A is a conceptual view illustrating a control method of a mobile terminal according to one embodiment of the present invention.
Figure 4B:
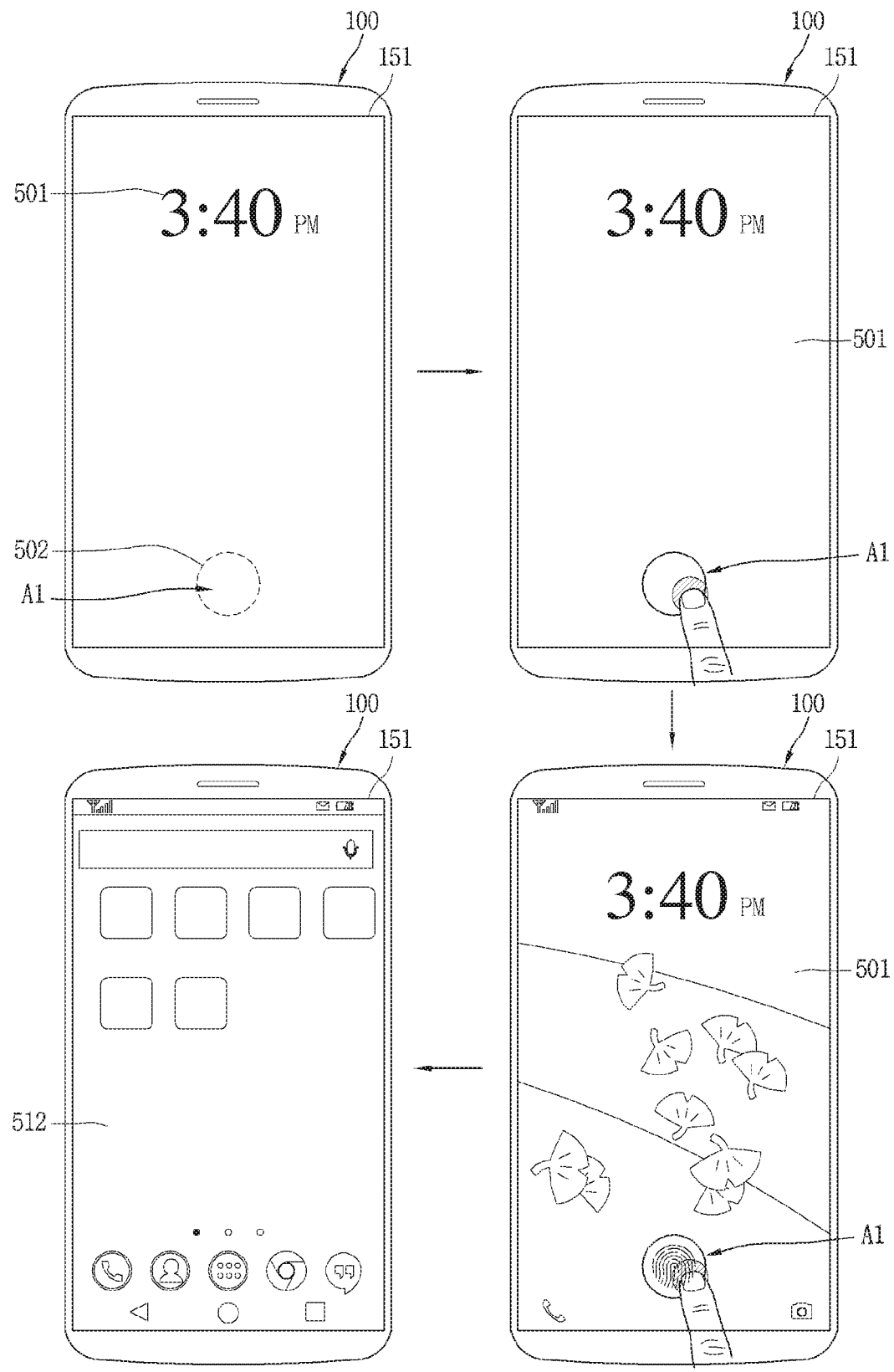
FIGS. 4B to 4D are conceptual views illustrating a control method in accordance with various embodiment of the present invention.
Figure 4C:
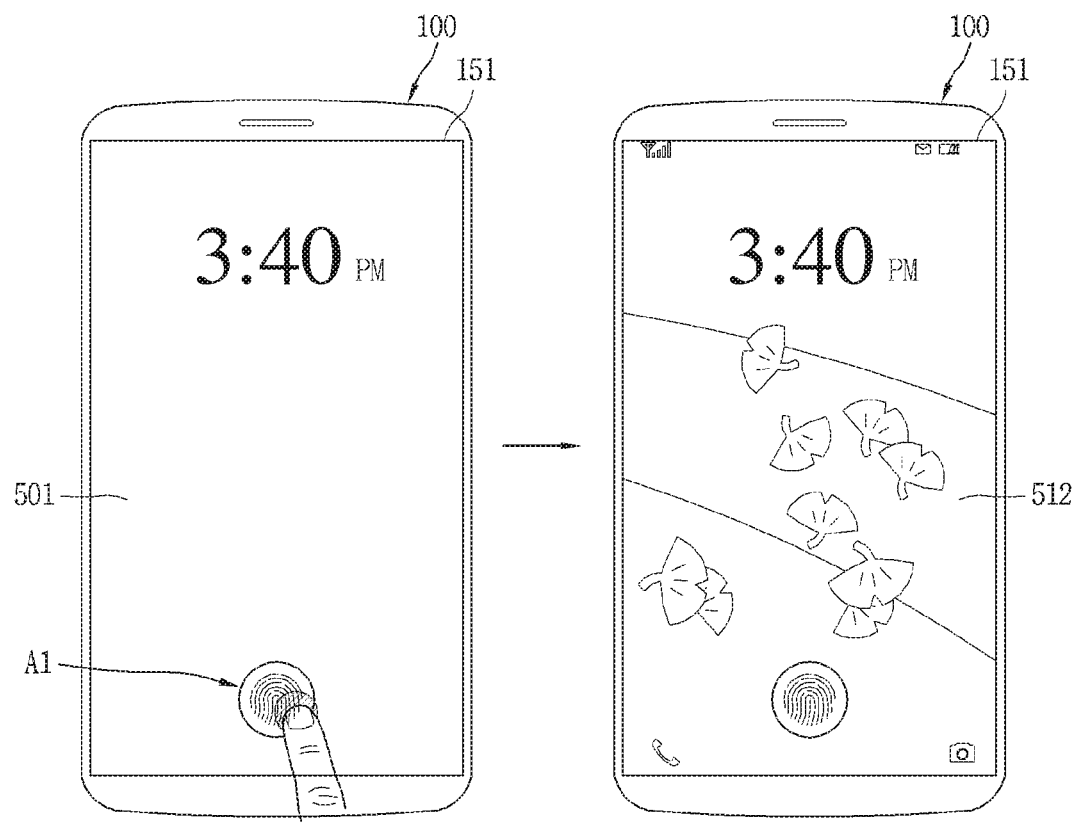
Figure 4D:
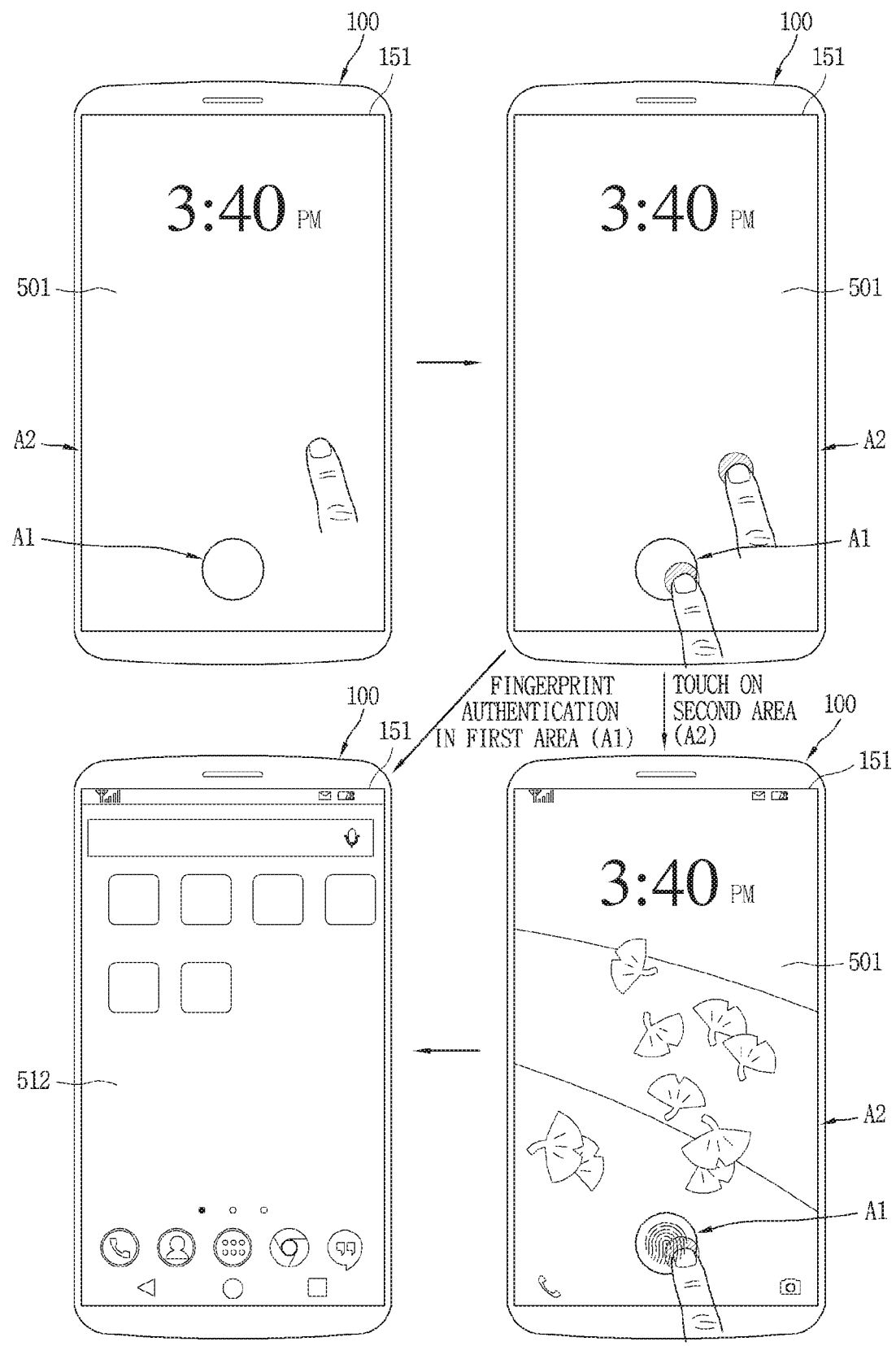

FIG. 4A is a flowchart illustrating a method for controlling a mobile terminal according to one embodiment of the present invention, and FIGS. 4B to 4D are conceptual views illustrating a control method according to various embodiments of the present invention.

Referring to FIGS. 4A and 4B, in a screen lock state of the mobile terminal, a touch input on the first area A1 is detected at the first sensing resolution (S21). The controller 180 changes a sensing resolution of the first area A1 to the second sensing resolution based on the touch input (S22).

In the lock state, the touch screen 151 may be deactivated, or an 'Always On' image may be displayed on one area of the touch screen. In the lock state, the touch sensing module is in the touch receiving mode. Meanwhile, in the lock state, the touch screen 151 may display an indicator 502 indicating the first area A1 together with the image 501.

While the first area A1 senses the touch input, the second area A2 is blocked from receiving a touch input. That is, referring back to FIG. 3C, the controller 180 control first and second electrode lines which are located in the second area A2 but are not located in the first area A1, so as not to detect a touch input.

The controller 180 controls the touch screen 151 to display a lock screen 511 (see FIG. 6B) based on a specific type of touch input detected by the first area A1. The specific type of touch input may correspond to a long touch applied for a specific period of time.

When the touch input is received by the first area A1, the controller 180 changes the sensing resolution of the touch sensing module to the second sensing resolution so as to be switched to the fingerprint sensing mode, and controls the touch sensing module so that fingerprint information of a finger making contact with the first area A1 is acquired (S23). In this case, the second area A2 may receive a touch input.

The controller 180 controls the touch sensing module to acquire the fingerprint information of the finger making contact with the first area A1, and performs a user authentication procedure using the acquired fingerprint information (S24). While the fingerprint information is being obtained, a touch input is not detected by the second area A2.

When the authentication procedure is successfully completed based on the fingerprint information, the controller 180 unlocks the screen lock state. When unlocked, the lock screen 511 is changed to preset screen information 512 (S25).

When unlocked, the controller 180 switches the mode of both the first and second areas A1, A2 to the touch receiving mode so that a touch input is detected at the first sensing resolution.

Meanwhile, the controller 180 controls the touch screen 151 to display the lock screen 511 when a knock input is applied to the first area A1. In this case, when a specific touch input is detected in the first area A1 together with the knock input, the fingerprint sensing mode may be activated.

According to this embodiment, unintended screen unlocking can be prevented since the fingerprint sensing mode is activated initially when a touch input on a specific area defined on the touch screen is applied, and then the screen lock state is unlocked by acquiring fingerprint information.

FIG. 4C is a conceptual view illustrating a control method of a mobile terminal according to another embodiment of the present invention.

In the embodiment, the controller 180 controls the touch screen 151 to display a lock screen 511 when a first touch input is applied to the first area A1, and controls the touch sensing module to obtain fingerprint information when a second touch input is applied to the first area A1. When the lock screen 511 is displayed, a user may enter his/her authentication information (e.g. password, pin code) other than fingerprint information to unlock.

The second touch input may correspond to pressure of a touch input in which pressure is sensed unlike the first touch input. In this case, the touch screen 151 may display screen information 512 displayed after completing the authentication instead of the lock screen 511.

FIG. 4D is a conceptual view illustrating a feature of switching to a fingerprint sensing mode based on a touch input, in accordance with another embodiment of the present invention.

Referring to FIG. 4D, in the screen lock state, the touch screen 151 may be deactivated, or may display an image 501 and/or an indicator indicating the first area A1 on a specific area of the touch screen. The controller 180 activates the touch receiving mode of the touch sensing module. Accordingly, fingerprint information may also not be obtained in the first area A1.

The controller 180 controls to obtain fingerprint information in the first area A1 based on a touch input on the touch screen 151, and to receive a touch input in the second area A2.

When a touch is applied to the first area A1, the controller 180 acquires fingerprint information, and performs a user authentication procedure. When the obtained fingerprint information matches with prestored fingerprint data, the lock state is unlocked. When unlocked, the touch screen 151 displays first screen information 512. The first screen information 512 may correspond to a home screen page, etc.

Meanwhile, when a touch input is detected in the second area A2 after the touch input is applied to the first area A1, the controller controls to display a lock screen 511 corresponding to a lock state. The controller 180 may perform the user authentication procedure through a password or the like entered while the lock screen 511 is being displayed.

The controller controls the first area A1 so as to acquire fingerprint information while the lock screen 511 is being displayed. When the fingerprint information is obtained by the first area A1, the controller 180 may proceed with the user authentication procedure using this fingerprint information.

According to these embodiments, fingerprint information is obtained by a specific area on the touch screen to unlock. When a touch is applied to the specific area or a specific type of touch input is received on the touch screen, the specific area is switched to the fingerprint sensing mode so as to acquire fingerprint information. As a result, obtaining fingerprint information and performing user authentication caused by an unintended or accidental touch can be prevented.

Figure 5:
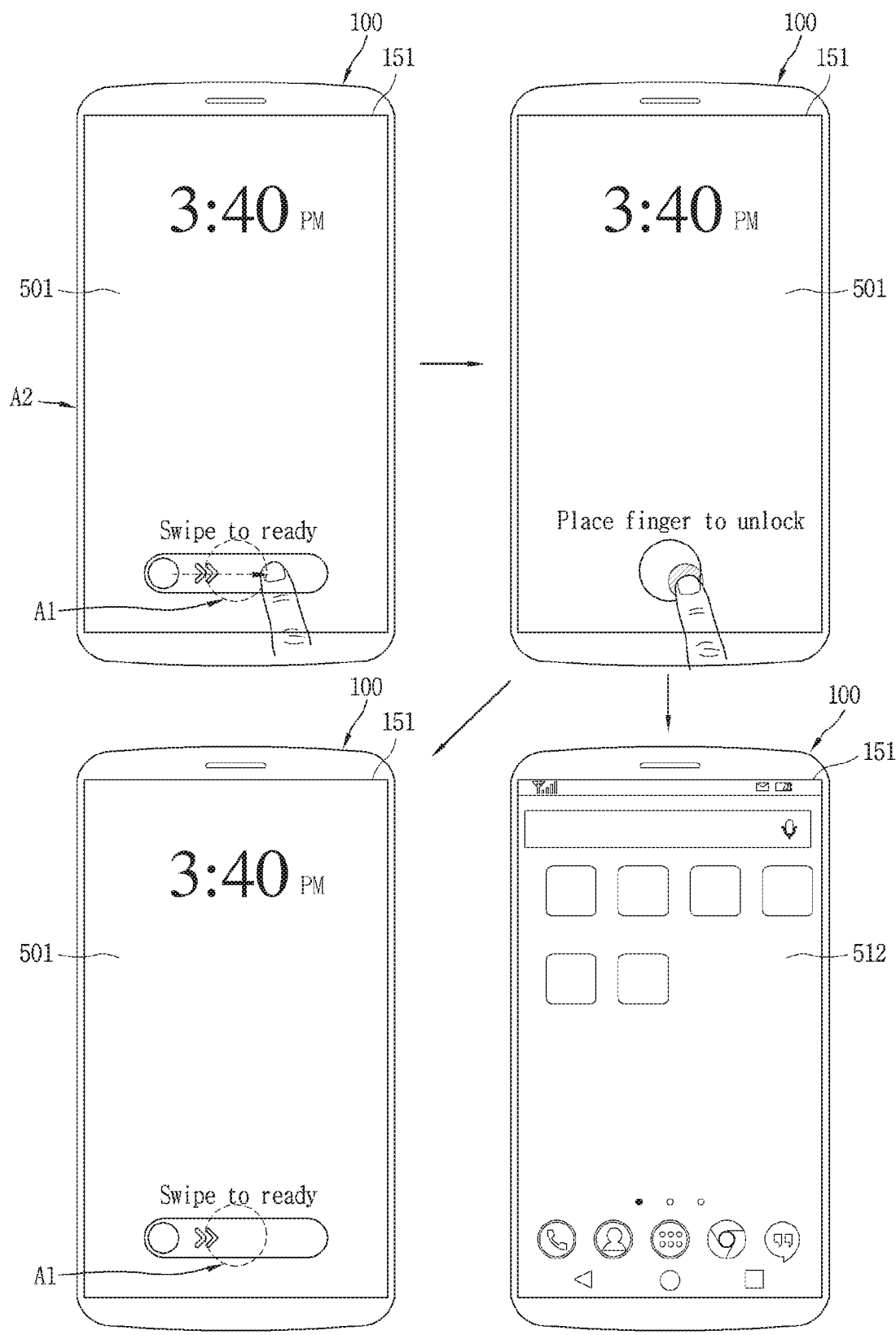
FIG. 5 is a conceptual view illustrating a control method for unlocking a screen lock state based on a touch input on a specific area including a first area, in accordance with another embodiment of the present invention.

FIG. 5 is a conceptual view illustrating a control method for unlocking a screen lock state based on a touch input applied to a specific area including a first area, in accordance with another embodiment of the present invention.

Referring to FIG. 5, in the lock state, the touch screen 151 may be an Always On Display (AOD) image 501. The image 501 may include time information, guide information and the like to unlock.

According to the embodiment of the present invention, in the lock state, the touch screen 151 includes a guide image of 'Swipe to ready' for unlocking. The guide image is displayed adjacent to the first area A1.

The controller 180 controls the touch sensing module of the touch screen 151 to maintain the touch receiving mode in the lock state while the image 501 is being displayed. When the controller 180 receives a touch input in a continuous manner from at least one area including the first area A1, the controller 180 switches the touch receiving mode of the first area A1 to the fingerprint sensing mode, which allows the first area A1 to obtain fingerprint information.

Here, the continuous touch input may correspond to dragging, a swipe, or the like moving from the second area A2 to the first area A1.

The controller 180 controls the first area A1 to acquire fingerprint information based on the specific type of touch input, and controls the remaining area so as not to receive a touch input. Thus, a touch input may not be applied to the second area A2 for a specific period of time. However, when the specific period of time t passes, the controller 180 switches the touch screen 151 to the touch receiving mode so that the first and second areas A1, A2 receive a touch input.

Meanwhile, the controller 180 acquires fingerprint information of a finger making contact with the first area A1. A user authentication procedure is performed using the fingerprint information, and the screen lock state is unlocked when the authentication is successfully completed. When unlocked, the touch screen 151 displays first screen information 512.

A continuous touch input moving in one direction is illustrated as an example in the drawing, but the continuous touch input is not limited to this. It may be a touch pattern over first and second areas A1, A2.

According to this embodiment of the present invention, the user authentication procedure is performed only when a touch input is applied to an area including first and second areas A1, A2. Thus, performing the user authentication due to an unintended or accidental touch can be prevented.

Figure 6A:
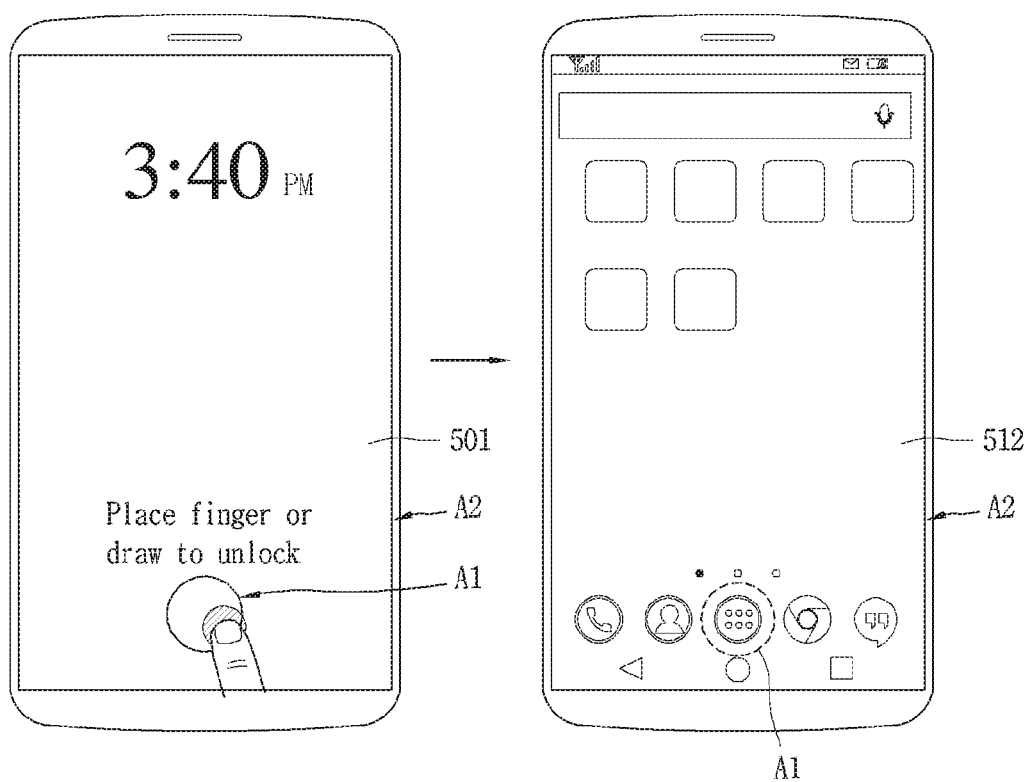
FIGS. 6A and 6B illustrate a control method for unlocking a screen lock state, in accordance with another embodiment of the present invention.
Figure 6B:
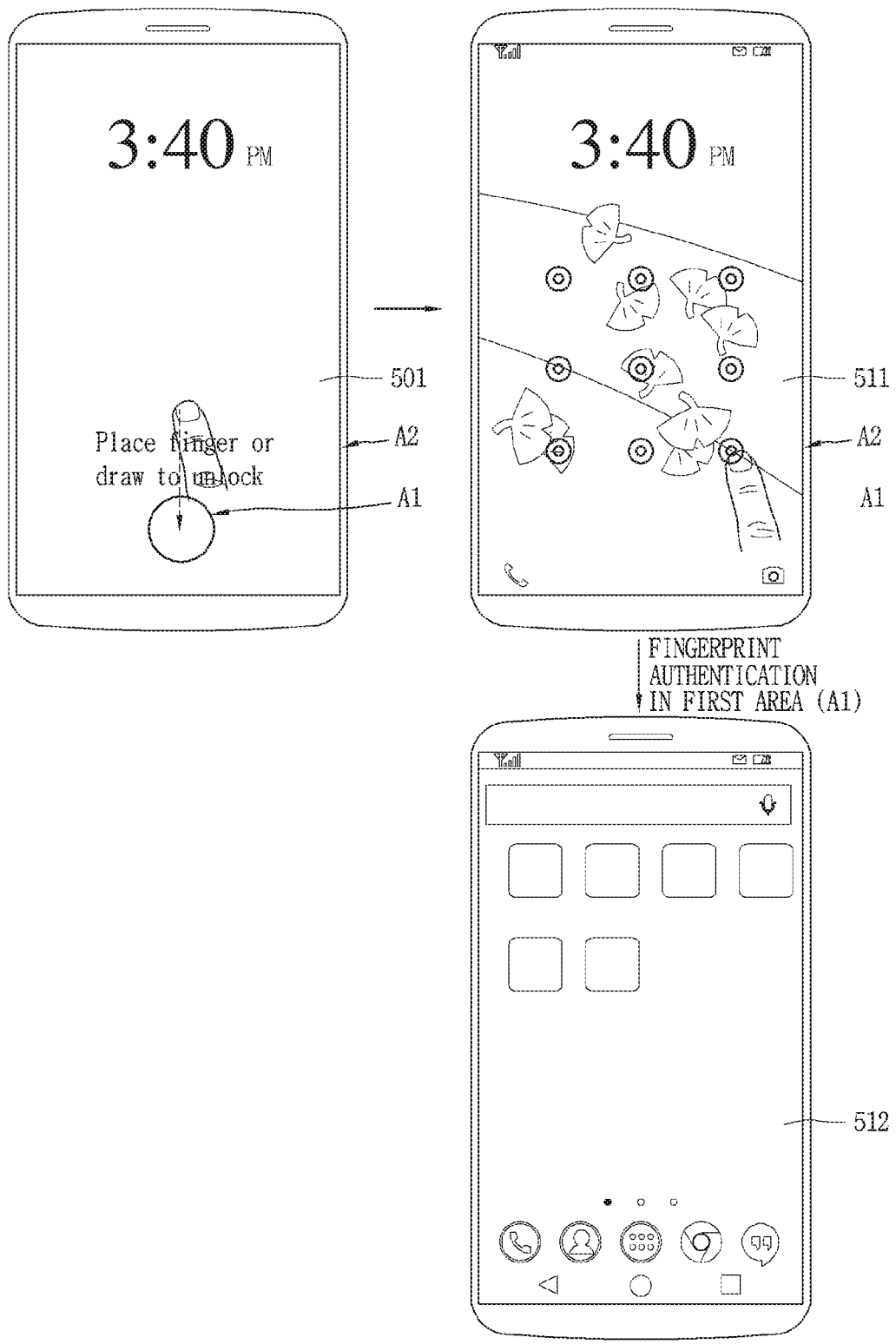

FIGS. 6A and 6B illustrate a control method for unlocking a screen lock state, in accordance with another embodiment of the present invention.

Referring to FIGS. 6A and 6B, in the lock state, the touch screen 151 may be an Always On Display (AOD) image 501. While the image 501 is being displayed, the touch screen 151 is in the touch receiving mode.

However, when a touch input (long touch input) on the first area A1 for a specific period of time is detected, the controller 180 controls the touch screen 151, so that the first area A1 obtains fingerprint information. Accordingly, the controller 180 switches the touch receiving mode to the fingerprint sensing mode while a finger is in contact with the touch screen, and acquires the fingerprint information to perform a user authentication procedure.

When the authentication procedure is performed, first screen information 512 is displayed on the touch screen 151. In this case, the controller 180 switches the mode to the touch receiving mode so as to receive a touch input from both the first and second areas A1, A2.

Accordingly, a user may enter fingerprint information while applying a specific type of touch input on a specific area of the touch screen 151. Thus, the lock state can be easily unlocked without complicated steps for entry and a step for activating the fingerprint sensing mode.

Referring to FIG. 6B, when a continuous touch input on one area of the touch screen 151 including the first area A1 is detected, the controller 180 controls the touch screen to display a lock screen 511. The lock screen 511 may include an input image or an input window for entering user authentication information such as a password or the like to perform the user authentication procedure.

In other words, a user may enter fingerprint information or different kinds of authentication information by applying another touch input to the first area A1.

Figure 7A:
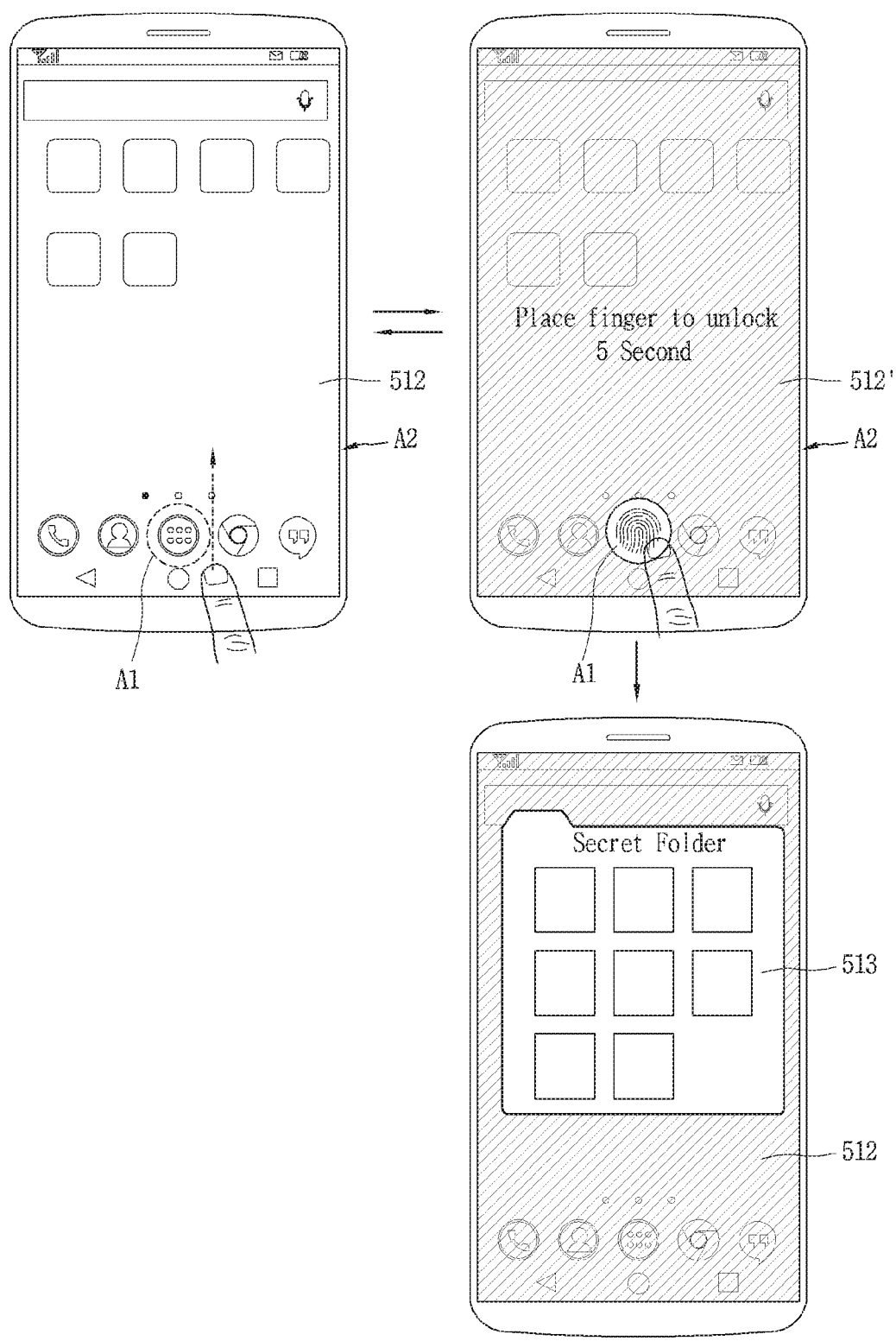
FIGS. 7A and 7B are conceptual views illustrating a control method for displaying lock state information using fingerprint information.
Figure 7B:
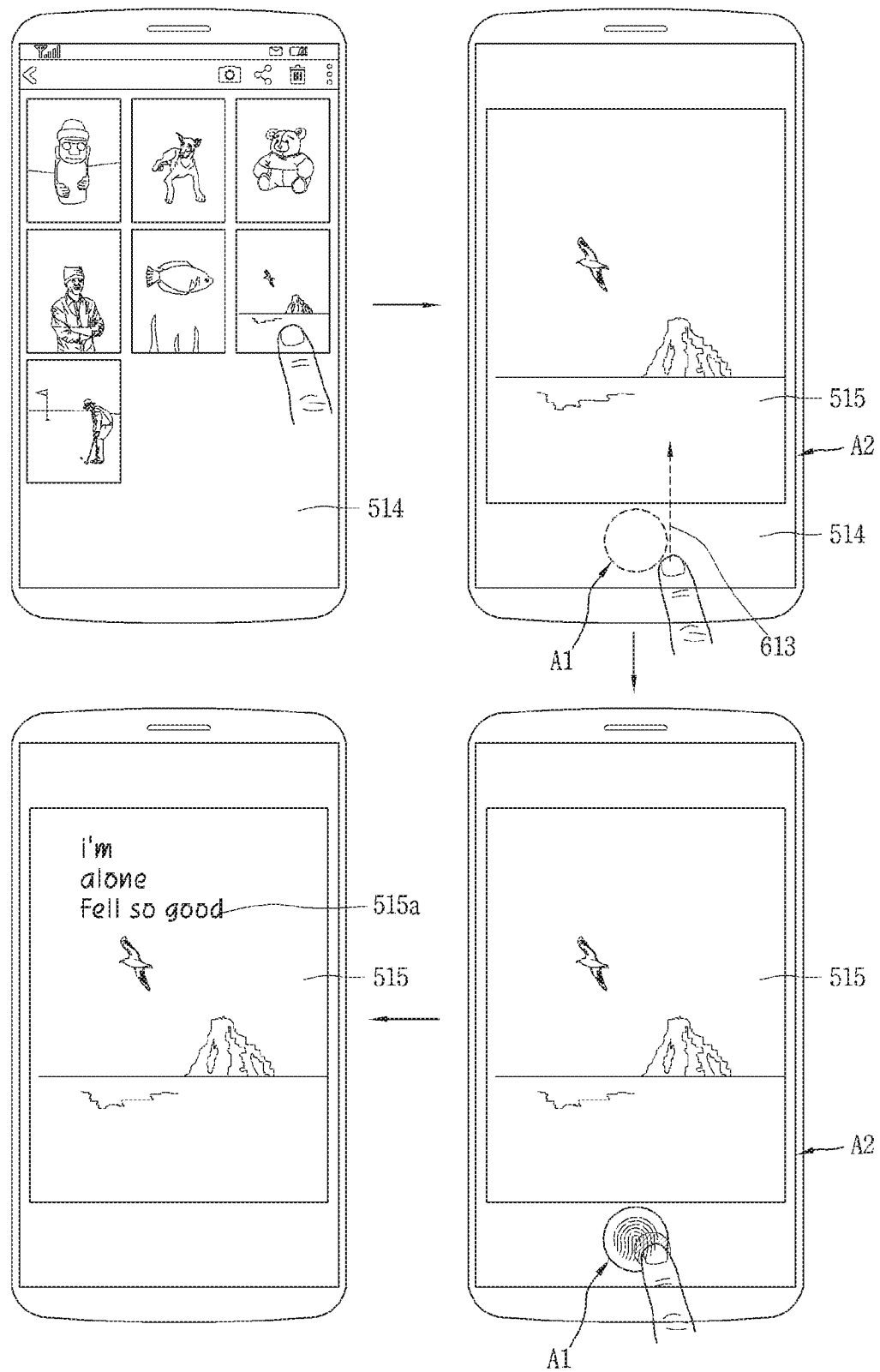

FIGS. 7A and 7B are conceptual views illustrating a control method for displaying screen lock information using fingerprint information.

Referring to FIG. 7A, the touch screen 151 displays first screen information 512. The first screen information 512 includes at least one content for receiving a touch input to execute a function. The at least one content may be displayed on the first and second areas A1, A2. The controller 180 activates the touch receiving mode to receive a touch input on the content displayed on the first and second areas A1, A2. In this case, the first area A1 receives a touch input to generate a specific control command instead of acquiring fingerprint information.

However, the controller 180 switches the touch receiving mode of the first area A1 to the fingerprint sensing mode when a specific type of touch input is applied to the first area A1. For example, the specific type of touch input is a continuous touch input (drag or swipe) across the first area A1, which is distinguished from the type of touch input applied to the content displayed on the first area A1.

The controller 180 activates the fingerprint sensing mode of the first area A1 for a specific period of time (few seconds) when the continuous touch input passing the first area A1 is applied. The controller 180 controls the touch screen 151 so that the second area A2 receives a touch input even when the first area A1 is switched to the fingerprint sensing mode.

In this case, the touch screen 151 may display screen information 512' by changing brightness and color of the first screen information 512. In addition, an indicator for indicating the first area A1 may be displayed. Meanwhile, when a touch input is applied to the second area A2 of the touch screen 151, the controller 151 restores the changed screen information 512' to the screen information 512, and activates the fingerprint mode of the first area A1. The changed screen information 512' may include information of a time for which the fingerprint sensing mode of the first area A1 is maintained.

The controller 180 acquires fingerprint information of a finger making contact with the first area A1 for a specific period of time, and performs a user authentication procedure using the obtained fingerprint information. When the user authentication is successfully completed, the controller 180 controls the touch screen 151 to display additional information 513.

The additional information 513 may include locked contents required to enter a password for execution and/or activation. The additional information 513 may be displayed as a window overlapping on the changed screen information 512', but the present invention is not limited thereto. The window may be displayed on the second area A2.

For example, when the first screen information 511 corresponds to a home screen page layout including a plurality of icons, the controller 180 may change the layout so that the touch screen 151 displays screen information including additional contents. The additional contents may correspond to contents related to the detected fingerprint information.

When the user authentication is successfully completed or the user authentication is failed, the controller 180 switches the fingerprint sensing mode of the first area A1 to the touch receiving mode again so as to receive a touch input on the additional information 513.

According to this embodiment of the present invention, the user authentication is proceeded through fingerprint information acquired by the first area A1 while the first screen information is being displayed. Accordingly, the locked contents related to the first screen information can be displayed.

In description of this exemplary embodiment of the present invention, an additional icon is displayed on the home screen page, but the contents may correspond to information related to the currently displayed screen information or personal information set by the user.

Referring to FIG. 7B, the touch screen 151 displays second screen information 514 including a plurality of images. The touch screen 151 displays an enlarged selected image 515 based on a touch input on one of the plurality of images. While the second screen information 514 and/or the selected image 515 is or are being displayed on the touch screen 151, the controller 180 activates the touch receiving mode so that the first and second areas A1, A2 receive a touch input.

While the selected image 515 is being displayed, the controller 180 outputs another image or executes a function related to the image based on a touch input applied to the first and second areas A1, A2.

However, when a specific type of touch input moving across the first area A1 is applied while the selected image 515 is being displayed, the controller 180 switches the touch receiving mode of the first area A1 to the fingerprint detection mode.

The touch sensing module of the touch screen 151 acquires fingerprint information of a finger making contact with the first area A1 while the image 515 is being displayed. In this case, the second area A2 is controlled so as not to receive a touch input. When a user authentication procedure is performed based on the fingerprint information acquired by the first area A1, the touch screen 151 displays hidden information 515a.

Here, the hidden information 515a is not displayed until before the authentication procedure is completed. In addition, the hidden information 515a is related to the image 515 and the acquired fingerprint information. The hidden information 515a is stored in the memory 170 together with the image 515. The hidden information 515a is displayed on the image 515.

While the image 515 is being displayed together with the hidden information 515a, the controller 180 switches the fingerprint sensing mode of the first area A1 to the touch receiving mode. Accordingly, a user may perform a specific function related to the hidden information 515a and the image 515 by applying a touch input to the first and second areas A1, A2 of the touch screen 151.

Figure 8:
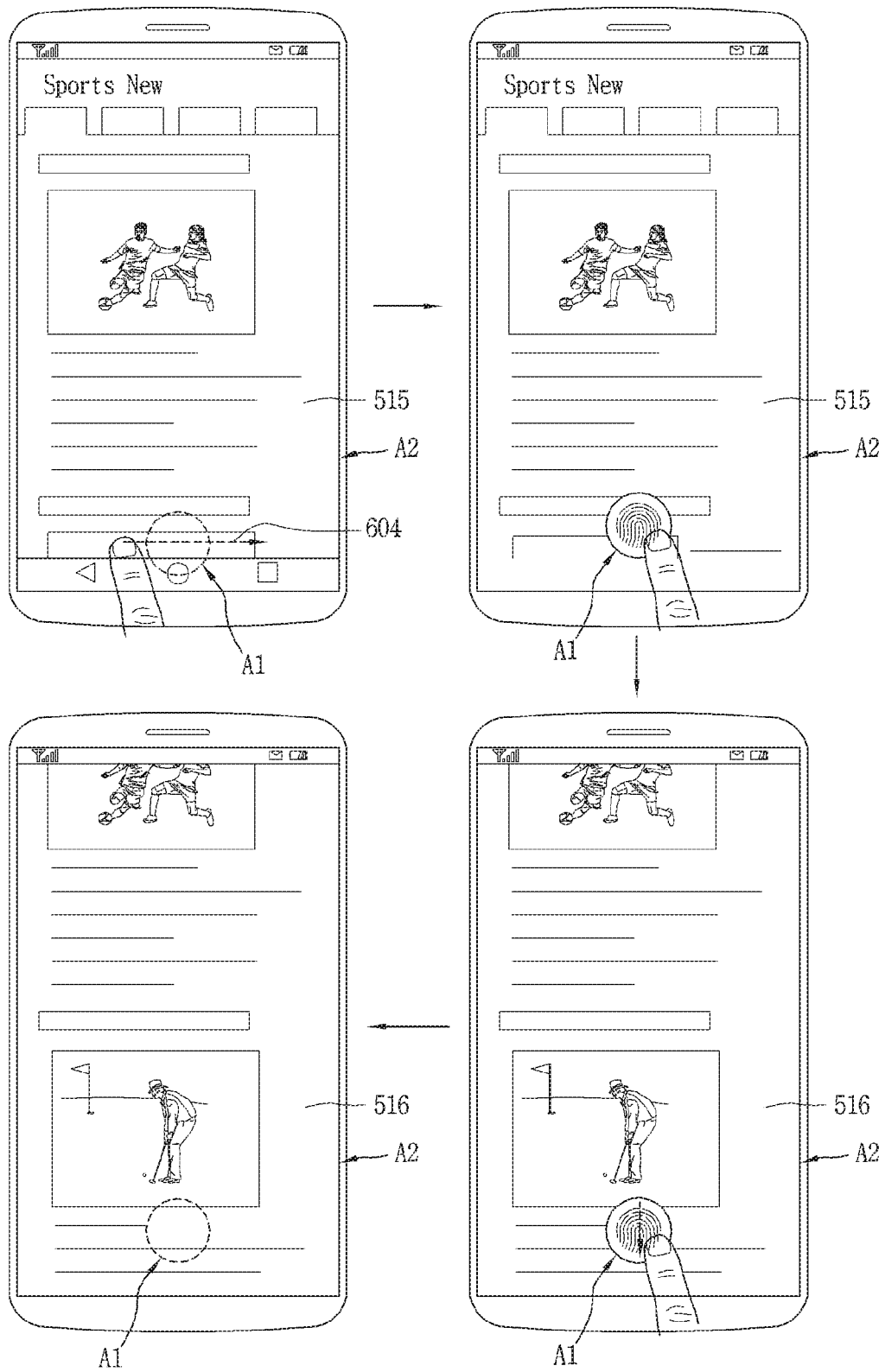
FIG. 8 is a conceptual view illustrating a method for controlling a specific function based on a touch input detected by a first area at a first sensing resolution, in accordance with another embodiment of the present invention.

FIG. 8 is a conceptual view illustrating a method for controlling a specific function based on a touch input detected by a first area at a first sensing resolution, in accordance with another embodiment of the present invention.

Referring to FIG. 8, the touch screen 151 displays third screen information 515. While the third screen information 515 is being displayed, the controller 180 activates the touch receiving mode and controls the third screen information 515 based on a touch input sensed. For example, the third screen information 515 may be changed by a scroll control command generated based on a touch input applied to the third screen information 515.

The controller 180 switches the touch receiving mode of the first area A1 to the fingerprint sensing mode based on a continuous touch input moving across the first area A1. When it is switched to the fingerprint detection mode, the first area A1 may detect a touch input at the second sensing resolution, which is higher than the first sensing resolution.

Accordingly, when a continuous touch is applied to the first area A1, the first area A1 may sense a moving touch input at the second sensing resolution. The controller 180 may generate a specific control command while a touch input is sensed in the first area A1. For example, while a touch input is detected in the first area A1, a scroll bar may be generated to change the third screen information 515. The touch input applied to the first area A1 corresponds to a stationary touch input, and the third screen information 515 may be scrolled at a specific speed.

Alternatively, the controller 180 generates a control command based on a touch input including fine or delicate movement on the first area A1. For example, a control command for changing the third screen information 515 may be generated.

The controller 180 switches the fingerprint sensing mode back to the touch receiving mode when a touch is not applied within a predetermined time after the fingerprint sensing mode of the first area A1 is activated. Accordingly, it is switched to the touch receiving mode again when a touch is not applied to the first area A1 for the predetermined time.

According to this embodiment of the present embodiment, a user can generate a specific control command based on a touch applied to the first area A1 in the fingerprint sensing mode.

Figure 9:
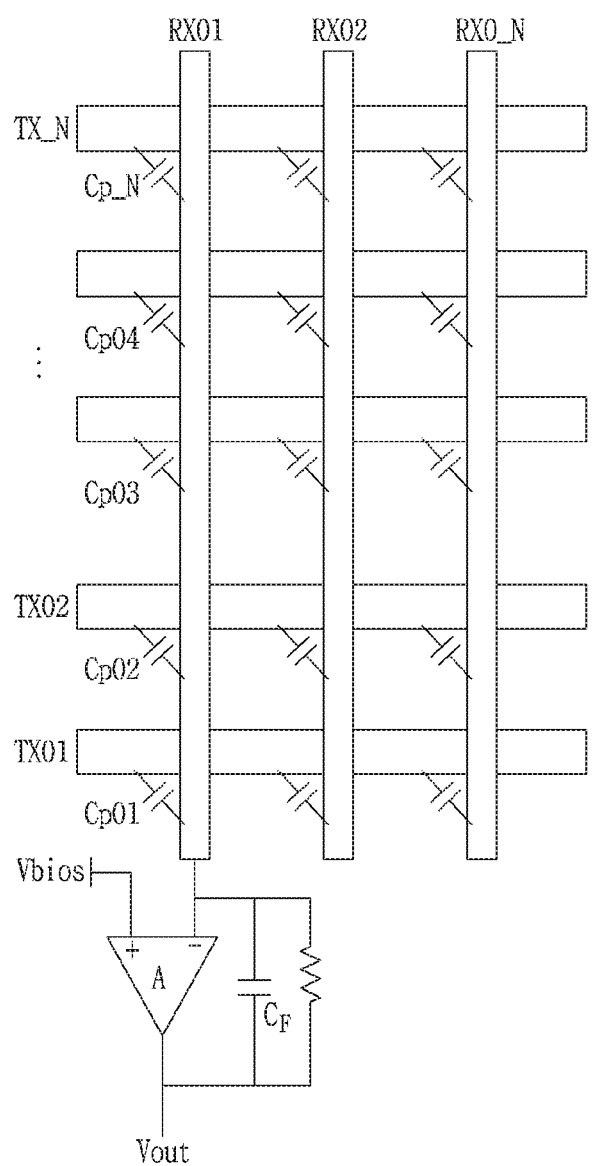
FIG. 9 is a conceptual view illustrating a control method for preventing a parasitic effect when only part of a plurality of electrode lines detects changes in capacitance.

FIG. 9 is a conceptual view illustrating a control method for preventing a parasitic effect when only part of a plurality of electrode lines detects changes in capacitance.

The first sensing line includes Tx electrode lines, and the second sensing line includes Rx electrode lines. The rest of the Tx electrode lines, which are not overlapping with the first area A1, are deactivated while fingerprint information is detected by the first area A1.

In this embodiment of the present invention, a plurality of capacitors connected to the Tx electrode lines and the Rx electrode lines are included. The controller 180 applies a bias voltage (Vbias) to a capacitor connected to the deactivated Tx electrode line.

When the same bias voltage is applied to the capacitor connecting the Tx electrode line to the Rx electrode line, the amount of electric charge becomes equal, thereby removing capacitance. Accordingly, a signal-to-noise ratio (SNR) generated when only part of a plurality of electrode lines is driven can be reduced.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

INDUSTRIAL AVAILABILITY

Embodiments of the present invention provide an electric device employing a touch sensing module for sensing a touch input that can acquire fingerprint information. Therefore, these embodiments may be applied to various relevant industrial fields.

The invention claimed is:
1. An electronic device, comprising:
a touch screen having a display area for displaying an image, a first area receiving a touch input and acquiring fingerprint information based on a touch applied to the display area, and a second area for receiving a touch input; and
a controller configured to switch a first area's mode from a touch receiving mode for receiving the touch input to a fingerprint sensing mode when the touch input is applied to the first area in a screen lock state,
wherein the touch screen is provided with a touch sensing module for receiving a touch input at a first resolution in the touch receiving mode, wherein the controller is configured to change the first sensing resolution of the first area to a higher second sensing resolution so as to acquire the fingerprint information in the fingerprint sensing mode, wherein the controller is configured to unlock the screen lock state based on fingerprint information acquired by the first area in the fingerprint sensing mode, wherein the controller is configured to control the touch screen so as to display a lock screen when a touch input is applied to the touch screen in the touch receiving mode, and wherein the controller is configured to switch the touch receiving mode to the fingerprint sensing mode so as to acquire the fingerprint information when a touch input is applied to the first area for a specific period of time in the touch receiving mode.

2. The electronic device of claim 1, wherein the controller is configured to ignore a touch input on the second area in the lock state.

3. The electronic device of claim 1, wherein the touch screen displays screen information in response to a touch input received in the touch receiving mode, and wherein the controller switches the touch receiving mode of the first area to the fingerprint sensing mode in response to a specific control command, and controls the touch screen so as to display additional information based on the fingerprint information.

4. The electronic device of claim 1, wherein the controller switches the touch receiving mode to the fingerprint sensing mode based on a continuous moving touch input on the first area.

5. The electronic device of claim 1, wherein the controller detects a touch applied to the first area at the second sensing resolution, and controls the screen information in a specific manner.

6. The electronic device of claim 1, wherein the touch screen displays an indicator indicating the first area in the lock state.

7. An electronic device, comprising:

a touch screen having a display area for displaying an image, a first area receiving a touch input and acquiring fingerprint information based on a touch applied to the display area, and a second area for receiving a touch input; and a controller configured to switch a first area's mode from a touch receiving mode for receiving the touch input to a fingerprint sensing mode when the touch input is applied to the first area, wherein the touch screen is provided with a touch sensing module having a plurality of electrode lines arranged at predetermined intervals so as to receive a touch input at a first sensing resolution in the touch receiving mode, and to detect a touch at a second resolution in the fingerprint sensing mode, wherein the controller is configured to change the first sensing resolution of the first area to a higher second sensing resolution so as to acquire the fingerprint information, wherein the controller is configured to maintain the sensing resolution of the second area at the first sensing resolution so as to receive the touch input, wherein the touch sensing module includes a plurality of sensing electrode line sections alternately arranged with each other and a plurality of dummy electrode line sections that is deactivated upon receiving the touch input, and wherein each of the plurality of sensing electrode line sections and of the plurality of dummy electrode line sections has a predetermined number of electrode lines.

8. The electronic device of claim 7, wherein the touch sensing module is electrically connected to one of a first circuit board and a second circuit board according to whether the mode is the fingerprint sensing mode or the touch receiving mode.

9. The electronic device of claim 8, wherein the plurality of sensing line sections each includes a plurality of electrode lines that is connected to form a sensing line so as to sense the touch input at the first sensing resolution.

10. The electronic device of claim 9, wherein the touch sensing module is selectively connected to a first circuit board or a second circuit board depending on the touch receiving mode and the fingerprint sensing mode, and wherein the plurality of dummy electrode line sections disposed in the second area is partially disconnected from the first and second circuit boards in the touch receiving mode and the fingerprint sensing mode.

11. The electronic device of claim 10, wherein a plurality of electrode lines arranged in one direction and disposed in the second area adjacent to the first area is disconnected from a plurality of electrode lines arranged in the one direction in the first area, and wherein at least part of the plurality of electrode lines is electrically connected to each other so as to form one single sensing line that senses the touch input at the first sensing resolution.

12. The electronic device of claim 10, wherein the first area includes a dummy electrode line section disconnected from the first and second circuit boards so that the first area receives the touch input at the first sensing resolution.

13. The electronic device of claim 12, further comprising a switch unit connected to electrode lines of the touch sensing module, wherein the switch unit includes a first switch and a second switch for connecting the plurality of electrode lines of the sensing line sections to the first circuit board and the second circuit board, respectively, and a third switch connected to each of the plurality of electrode lines of the dummy line sections, wherein the controller is configured to selectively connect or disconnect the first and second switches in the touch receiving mode and the fingerprint sensing mode.

14. The electronic device of claim 13, wherein the plurality of electrode lines connected to the first switch is grouped into a plurality of sensing lines so as to be connected to the first circuit board, and detects the touch input at the first sensing resolution in the touch receiving mode.

15. The electronic device of claim 13, wherein the switch unit includes a fourth switch disposed in the second area and connecting a plurality of sensing lines to the first circuit board, and wherein the controller is configured to control connection and disconnection of the fourth switch in the fingerprint sensing mode.

16. The electronic device of claim 13, wherein each of the plurality of electrode lines connected to the second switch is connected to the second circuit board in the fingerprint sensing mode so as to obtain the fingerprint information at the second sensing resolution.

17. The electronic device of claim 13, wherein the third switch is connected in the touch receiving mode and is disconnected in the fingerprint sensing mode.

18. The electronic device of claim 7, wherein the touch sensing module includes a first sensing layer having a plurality of Rx electrode lines extending in one direction and a second sensing layer having a plurality of Tx electrode lines extending in a direction intersecting the one direction,
> wherein the plurality of Tx electrode lines is connected to the plurality of Rx electrode lines by a plurality of capacitors,
>
> wherein the controller is configured to drive part of the plurality of Tx electrode lines in the fingerprint sensing mode, and
>
> wherein the controller is configured to apply a bias voltage to a capacitor connected to the rest of the Tx electrode lines.

19. The electronic device of claim 7, wherein the controller deactivates the second area so as not to sense a touch input applied to the second area in a screen lock state, and
> wherein the controller reactivates the second area based on a touch input applied to the first area.

* * * * *